Figure 1:
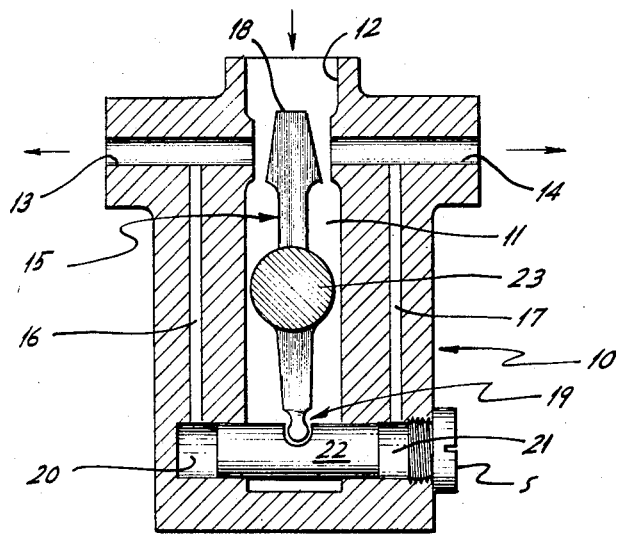

United States Patent Office 3,385,309
Patented May 28, 1968

3,385,309
FLUID FLOW CONTROL MEANS
William R. Bains, Tustin, Calif., assignor to Philco-Ford Corporation, a corporation of Delaware
Filed Nov. 3, 1965, Ser. No. 506,165
11 Claims. (Cl. 137—85)

This invention relates to fluid flow control means, and more particularly to improvements in valve means for controlling the relative rates of flow of gaseous fluid through a pair of outlet ports.

An important requirement of control valve means of one known type for regulating relative rates of fluid flow is that the valve be capable of controlling flow of large quantities of fluid over relatively short periods of time. Moreover, a valve used in this manner must be reliable even though it is subject to flow therethrough of impurities entrained by the fluid undergoing control.

One valve of this type comprises a resiliently mounted flapper within a cylindrical cavity and operable by electromagnetic means to control outflow of gas introduced at one end of the cavity, through a pair of oppositely disposed ports in lateral wall portions of the cavity. Such a valve is described and claimed in the application of George P. Carver, Ser. No. 189,030, filed Mar. 20, 1962, now Patent No. 3,215,162, and assigned to Ford Motor Company.

It is an objective of the present invention to provide improved control valve means that meets the foregoing requirements.

It is a more specific object to improve valves of the kind shown in said copending disclosure by reducing the force required to lift the flapper against the pressure existing within the internal system. Broadly, this is accomplished by utilizing a portion of the valved gas to provide a counter-balancing torque to the flapper's mounting shaft.

It is a general objective of the invention to provide improved fluid flow control valve means characterized by simplicity of construction and reliability of operation.

In achievement of the foregoing and other objectives, the invention is directed to improvements in fluid flow control valve means of that type having a central hollow body portion, a supply port connected to said portion, a pair of oppositely disposed outlet ports leading from said portion, and a flapper within the hollow portion for controlling the relative rates of fluid flow through the outlet ports. The improvement resides in provision of a pair of pilot conduits, each of which communicates with an outlet port and with generally cylindrical chamber means extending transversely of both the hollow portion and a portion of the flapper spaced from its controlling end. A plunger is disposed within the chamber means and is linked to the mentioned spaced portion of the flapper, in such manner that part of the gas discharged through the then-open one of the outlet ports will feed through its communicating pilot conduit to exert force on the plunger. This force moves the plunger, with the result that a counterbalancing or restoring force is exerted upon the flapper tending to move it toward the mentioned open outlet port. Means are provided for cycling the flapper in accordance with a predetermined control signal whereby the flapper dwells on each of the outlet ports to control fluid flow therethrough. The means for cycling advantageously is assisted in carrying out its function by the auxiliary pilot conduit arrangement characterizing the invention.

Figure 2:
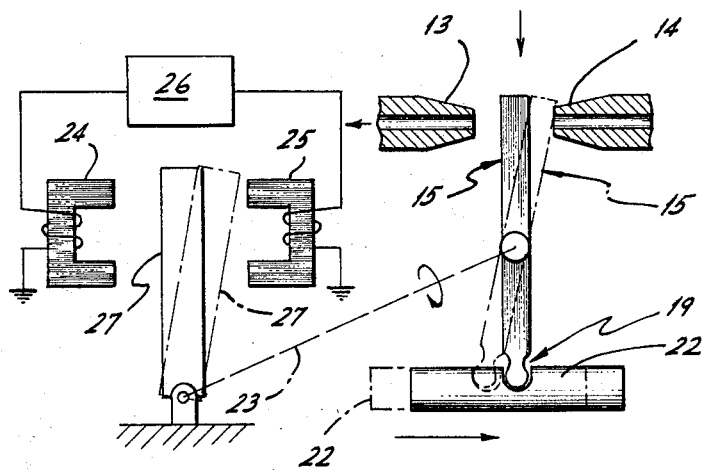

The manner in which the foregoing as well as other objects and advantages of the invention may best be achieved will be understood from a consideration of the following description, taken in light of the accompanying drawing in which:

FIGURE 1 is an elevational showing, in section, of a preferred valve structure embodying the invention; and
FIGURE 2 is a somewhat diagrammatic showing of the valve structure shown in FIGURE 1, and illustrating its preferred mode of operation.

With particular reference first to FIGURE 1, the valve comprises a housing 10 having a substantially cylindrical cavity 11 extending lengthwise therein. A supply port 12 communicates with one end of the cavity and is adapted to be connected to a pressurized source (not shown) of fluid the flow of which is to be controlled. The outlet ports 13 and 14 are oppositely disposed, on the sides of cavity 11. A flapper 15 is pivotally supported within cavity 11, and has a free end 18 that extends between the valve outlet ports 13 and 14.

In particular accordance with the present invention, pilot conduits 16 and 17 are provided having one end communicating with outlet ports 13 and 14, respectively. Conduits 16 and 17 communicate at their other ends with a pair of axially aligned cylindrical chambers 20 and 21 formed in housing 10 and extending transversely of the lower end of cylindrical cavity 11. A plunger 22 is disposed within the transversely extending cylindrical chambers 20 and 21. A central portion of the plunger extends across the cavity 11 and is coupled to the end of flapper 15 by a ball-and-socket arrangement designated generally by numeral 19, in such a manner that the flapper and the plunger 22 may move as a unit, the former pivoting about its shaft 23 and the latter sliding within the chambers. A threaded plug S is axially aligned with the chamber and facilitates assembly of the valve.

With reference also to FIGURE 2, the flapper is pivotally mounted upon a shaft 23 journalled within the valve housing 10. A pair of electromagnets 24 and 25 controlled by a pulse time modulator 26 cause an arm 27 coupled to shaft 23 to be alternately pivoted in one direction and in the other, whereby flapper 15 will alternately dwell on the seats of outlet ports 13 and 14. Flapper 15 and arms 27 are shown in FIGURE 2 only in their full right hand operating positions (broken lines) with the corresponding position of plunger 22 illustrated also in broken lines.

Control of the relative rates of fluid flow through the ports 13 and 14 is achieved by increasing the dwell time of the flapper on one of the seats of the ports and decreasing its dwell time on the other. Control is in accordance with electrical pulse signals fed to the electromagnets 24 and 25 by the pulse time modulator 26. In this manner a differential fluid flow through ports 13 and 14 is achieved, which flow is directly proportional to the control signals from the pulse time modulator. For a zero control signal, the dwell time on each of the ports is equal, producing an equal rate of fluid flow through the ports.

Considering operation of the valve in more detail, the working fluid enters inlet port 12, in the direction of the arrow, from which it divides to flow through outlet ports 13 and 14. Upon receipt of the pulse by electromagnet 25 from the dwell time modulator 26, flapper 15 is caused by solenoid action to dwell on the seat of port 14 (see broken line showings of arm 27 and flapper 15), preventing flow of fluid through port 14. Fluid then flows through the other outlet port 13. At the conclusion of the pulse to electromagnet 25 and upon receipt of a pulse by the other electromagnet 24, flapper 15 is caused to dwell on the seat of the other port 13, preventing flow of fluid through that outlet port and allowing it to flow through the opposite outlet port 14. The relative rates of fluid flow through ports 13 and 14 to directly proportional to the amount of dwell time of the flapper 15 on the respective seats of the outlet ports. In particular accordance with the invention, the action of the electromagnets is augmented by gas pressure exerted upon the plunger 22 through the pilot conduits and tending to restore the flapper, by exerting force upon the plunger, to seat upon the opposite port. The cross-sectional area of the plunger is of sufficient size that the pressure of gas fed through the pilot conduits is sufficient to exert adequate restoring forces upon the flapper, thereby minimizing the forces required of the electromagnets. Moreover, the plunger is so dimensioned as to cause the flapper to seek its center, or "neutral" position unless otherwise commanded by the electromagnets.

The control valve has particular application as a constant area valve for varying the flow direction, and consequently the reactive thrust, between opposing nozzles (not shown) connected to receive the fluid flowing from the outlet ports. Direct current control signals are modulated by the pulse time modulator at a predetermined frequency, producing an average control force proportional to the modulating input signal. With zero input signal the fluid alternately flow through the ports and to the connected nozzles for equal periods producing a zero net nozzle thrust.

A valve embodying the invention is unaffected by impurities in the fluid due to the disposition of the pilot conduit openings in a direction substantially perpendicular to the flow of fluid through the outlet ports, the inertia of the rapidly flowing impurities carrying them past the openings of the pilot conduit. A further advantage of the disclosed pilot valve arrangement is that the amount of electrical energy required to move the flapper is lessened. This is due to the fact that the plunger 22 functions as a balance piston for lifting the flapper from a closed outlet port, against the fluid pressure forces within the cavity 11.

It will be understood that plunger 22 can be located, if desired, to the same side of the shaft 23 as the outlet ports. Under this arrangement an end pair of the pilot conduits 16 and 17 would be interchanged to achieve the required counterbalancing of the flapper about its shaft.

I claim:

1. A control valve comprising: a valve housing defining a cavity; means defining a supply port for said cavity and a pair of oppositely disposed outlet ports; a flapper pivotally supported and having a free end extending between said outlet ports and pivotal to close one or the other of said outlet ports; chamber means extending transversely with respect to both the hollow portion and a portion of the flapper that is spaced from its pivot; a pair of pilot conduits each of which communicates with an outlet port and with said chamber means; a plunger disposed within said chamber means and linked to the mentioned spaced portion of the flapper, the construction and arrangement being such that part of the gas discharged through the open one of the outlet ports will feed through its communicating pilot conduit to exert force on the plunger, such force being transmitted to the flapper and tending to move the latter toward the mentioned open outlet port to close the same; and means for cycling the flapper in accordance with a predetermined control signal whereby the flapper dwells on each of the outlet ports to control fluid flow therethrough.

2. A control valve according to claim 1, and further characterized in that pivotal mounting of said flapper is provided by a shaft journalled within said valve housing, and said means for cycling the flapper comprises electromagnetically operable means coupled with said shaft.

3. A control valve according to claim 2 and characterized by the further inclusion of electrical control means including a pulse time modulator for actuating said electromagnetically operable means, whereby the relative rates of flow through said outlet ports is proportional to the dwell times of said flapper upon said outlet ports.

4. A fluid flow control valve comprising: a valve housing defining a cavity, said cavity having a supply port and a pair of oppositely disposed outlet ports in lateral wall portions of said cavity; pivotally mounted flapper means within said cavity for controlling the relative rates of fluid flow from said supply port through said outlet ports; means for cycling said flapper means in accordance with an electrical control signal whereby said flapper means dwells on respective ones of said outlet ports to control the rates of fluid flow therethrough; and means operable by the pressure of fluid leaving one of said outlet ports to urge said flapper toward a position closing the port that is open and opening the port that is closed.

5. A control valve according to claim 4, and further characterized in that said flapper means is pivotally mounted upon a shaft journalled within said housing, and said means for cycling said flapper means comprises electromagnetically operable means coupled with said shaft.

6. A control valve according to claim 5, and further characterized by the inclusion of pulse time modulator means for actuating said electromagnetically operable means, whereby the relative rates of flow through said outlet ports is proportional to the dwell times of said flapper means upon said outlet ports.

7. A control valve according to claim 4, wherein said last recited means comprises generally cylindrical chamber means extending transversely with respect to both the cylindrical cavity and said flapper; a pair of auxiliary conduits, each interconnecting one of said outlet ports and one of the opposite ends of said chamber means, a plunger reciprocably movable in said chamber means in response to the pressure of fluid flowing through one of said outlet ports to which an auxiliary conduit is connected, and means coupling said plunger to said flapper, whereby said plunger, as it is moved, urges said flapper to position closing the outlet port that is open.

8. A control valve according to claim 7, and further characterized in that said flapper means is pivotally mounted upon shaft means journalled within said housing, and said means for cycling said flapper means comprises electromagnetically operable means coupled with said shaft.

9. A control valve according to claim 7, and further characterized in that said chamber means comprises a pair of oppositely disposed axially aligned cylindrical chambers having confronting open ends communicating with said cavity, the central portion of said plunger extending across said cavity.

10. A control valve comprising: a valve housing defining a cavity; means defining a supply port and a pair of outlet ports for said cavity; a flapper pivotally supported and having an end portion extending over said outlet ports and pivotal to close one of the other of said outlet ports; generally cyclindrical chamber means in said housing extending transversely with respect to a portion of the flapper that is spaced from its pivot; a pair of pilot conduits each of which communicates with an outlet port and with said chamber means; a plunger disposed within and movable along the axis of said chamber means, said plunger being linked to the mentioned spaced portion of the flapper, the construction and arrangement being such that part of the gas discharged through the open one of the outlet ports will feed through its communicating pilot conduit to exert force on the plunger, such force being transmitted to the flapper and tending to move the latter toward the mentioned open outlet port to close the same; and means for cycling the flapper in accordance with a predetermined control signal whereby the flapper dwells on each of the outlet ports to control fluid flow therethrough.

11. A control valve according to claim 10, and further characterized in that the pivotal mounting of said flapper is provided by a shaft journalled within said valve housing, and means for cycling said flapper comprises electromagnetically operable means coupled with said shaft.

References Cited

UNITED STATES PATENTS

| | | | |
|---|---|---|---|
| 2,330,151 | 9/1943 | Smith | 137—612 X |
| 2,933,106 | 4/1960 | Gerwig et al. | 137—625.6 |
| 2,993,477 | 7/1961 | Panissidi | 137—625.63 |
| 2,999,640 | 9/1961 | Waterfill | 137—625.44 X |
| 3,015,313 | 1/1962 | Faisandier | 137—625.66 X |
| 3,017,864 | 1/1962 | Atchley | 137—83 X |
| 3,101,650 | 8/1963 | Blanton | 137—85 X |
| 3,141,383 | 7/1964 | Abild | 137—85 X |
| 3,211,177 | 10/1965 | Phillips et al. | 137—607 X |
| 3,211,182 | 10/1965 | Gyurik et al. | 137—625.64 X |
| 3,215,162 | 11/1965 | Carver | 137—624.18 X |
| 3,245,424 | 4/1966 | Olsen | 91—52 X |
| 3,272,077 | 9/1966 | Meulendyk et al. | 137—83 X |
| 3,275,017 | 9/1966 | Henry | 137—85 X |

M. CARY NELSON, *Primary Examiner.*

ROBERT C. MILLER, *Assistant Examiner.*